United States Patent [19]

Stern

[11] Patent Number: 4,600,919

[45] Date of Patent: Jul. 15, 1986

[54] THREE DIMENSIONAL ANIMATION

[75] Inventor: Garland Stern, Brookville, N.Y.

[73] Assignee: New York Institute of Technology, Old Westbury, N.Y.

[21] Appl. No.: 404,965

[22] Filed: Aug. 3, 1982

[51] Int. Cl.$^4$ .............................................. G09G 1/16
[52] U.S. Cl. .................................. 340/725; 340/728; 340/747
[58] Field of Search ............... 340/725, 728, 700, 747, 340/723, 744; 358/183

[56] References Cited

U.S. PATENT DOCUMENTS

| | | | |
|---|---|---|---|
| 3,523,289 | 8/1970 | Harrison, III | 340/725 |
| 3,792,243 | 2/1974 | Appel et al. | 340/725 |
| 4,189,743 | 2/1980 | Schure et al. | 340/747 |
| 4,233,631 | 11/1980 | Mahler | 358/183 |

OTHER PUBLICATIONS

Interactive Skeleton Techniques for Enhancing Motion Dynamics in Key Frame Animation; Burtnyk et al; Tutorial: Computer Graphics; IEEE Cat. No. EHO 147-9, pp. 370-375, reprinted from Communications of the ACM, vol. 19, No. 10; 10/76.

*Primary Examiner*—Marshall M. Curtis
*Attorney, Agent, or Firm*—Martin Novack

[57] ABSTRACT

The disclosure is directed to an improved method and apparatus for generating a sequence of video frames representative of three-dimensional animation. A plurality of key frames are stored, each key frame including a common figure having one or more joints, and each joint having associated therewith a set of vectors defining a limb. Each joint is defined in each frame by operator-controllable parameters which determine the three-dimensional position, rotational orientation, and scale factors of a local coordinate system in which the limb vectors are placed. A plurality of in-between frames are generated, the in-between frames including the common figure having one or more joints and limbs corresponding to the joints and limbs of the common figure in the key frames. The parameters of the joints of the in-between frames are obtained by interpolating in three dimensions, the position, rotational orientation, and scale factors of the corresponding joints of the key frames. In the preferred embodiment, the joints of each figure are arranged in hierarchical order, and the positional coordinates and rotational orientations of the local coordinate system for a particular joint are determined with respect to the local coordinate system of the next higher joint in the hierarchy. Also, the operator can control the interpolation during display of the in-between frames, so as to change the motion of a figure limb.

22 Claims, 11 Drawing Figures

THREE DIMENSIONAL ANIMATION

BACKGROUND OF THE INVENTION

This invention relates to the field of machine generation of animation and, more particularly, to a method and apparatus for generating sequences of frames on a two-dimensional screen that are representative of three-dimensional animated figures.

Animated films are in widespread use for educational and entertainment purposes. Animated films of reasonably high quality have traditionally been very expensive to make. The initial creative work includes generation of a basic story, a sound track, and basic character designs. Typically, a schedule is generated which describes the movements and timings of each scene to be produced, and layout sketches and "key" drawings are made which define the overall design of each scene. It has been generally observed that at this point most of the creative design work has already been done. The so-called "key" drawings or frames are still frames which show extremes of action. In the traditional animation procedure, people known as "in-betweeners" are employed to sketch frames which fill in the action between key frames. After in-betweens are sketched by hand, the hand-drawn pictures are typically transferred onto celluloid-acetate sheets and are then painted in by hand. Much labor is involved in obtaining the in-betweens, which typically comprise the majority of frames of the final work product. These tasks render the production of animated films an extremely expensive proposition. An advantage of the traditional animation process, however, is that the animator has virtually complete artistic freedom and control over the resulting film; i.e. anything that is drawn can be made to move in a desired fashion so natural-looking motion can generally be achieved.

In recent years, the field of machine generation of animation has made great strides. Advanced computer graphics techniques have improved the speed and quality of computer-generated animation. Computers can aid artistic animators in many ways, including automatic generation of in-between frames by interpolation of lines appearing in successive key frames. A technique of this type is described, for example, in an article entitled "Towards a Computer Animating Production Tool" by N. Burtnyk and M. Wein which appeared in the proceedings of Eurocomp Conference, Brunel - United Kingdom, May 1974.

It is known in the computer graphics art that three-dimensional representation of animated figures can be stored as a set of three dimensional points, and appropriate transformations can be used to automatically compute the projection of the three-dimensional figures onto a two dimensional surface, so that two dimensional computer generated animation images can be presented on a conventional two-dimensional screen. Three dimensional figures have also been represented in joint and limb configuration.

Representative prior art patents relating to techniques such as computer-generation of in-between frames and three-dimensional animation are as follows: U.S. Pat. Nos. 3,364,382; 3,523,389; 3,585,628; 3,603,964; 3,700,792; 3,723,803; 3,747,087; 3,792,243; 3,883,861; 3,917,955; 3,885,096; 4,017,680; 4,127,849; 4,189,743; 4,189,744; 4,200,867; 4,213,189.

As above-stated, the automatic machine generation of in-between frames can greatly reduce the amount of time and effort that is necessary to generate a series of animated frames. Particularly when dealing with three-dimensional animation, however, the automatic generation of in-between frames can tend to result in unnatural motion of the three dimensional figures.

It is among the objects of the present invention to provide a method and apparatus for generating frames of three-dimensional animated sequences which have natural-looking motion. It is a further object to provide an animator with a high degree of flexibility in obtaining the desired appearance of motion of figures with minimal labor.

SUMMARY OF THE INVENTION

The present invention is directed to an improved method and apparatus for generating a sequence of video frames representational of three-dimensional animation. In accordance with the method of the invention, a plurality of key frames are stored, each key frame including a common figure having one or more joints, and each joint having associated therewith a set of vectors defining a limb. Each joint is defined in each frame by operator-controllable parameters which determine the three-dimensional position, rotational orientation, and scale factors of a local coordinate system in which the limb vectors are placed. A plurality of in-between frames are generated, the in-between frames including the common figure having one or more joints and limbs corresponding to the joints and limbs of the common figure in the key frames. The parameters of the joints of the in-between frames are obtained by interpolating, in three dimensions, the position, rotational orientation, and scale factors of the corresponding joints of the key frames.

In the preferred embodiment of the invention, the joints of each figure are arranged in hierarchical order, and the positional coordinates and rotational orientations of the local coordinate system for a particular joint are determined with respect to the local coordinate system of the next higher joint in the hierarchy. Also, in accordance with the preferred embodiment, the operator can control the interpolation during display of the in-between frames, so as to change the motion of a figure limb.

Further features and advantages of the invention will become more apparent from the following detailed description when taken in conjunction with the accompanying drawings.

BRIEF DESCRIPTION OF THE DRAWINGS

FIG. 4, which includes

DESCRIPTION OF THE PREFERRED EMBODIMENT

Figure 1:
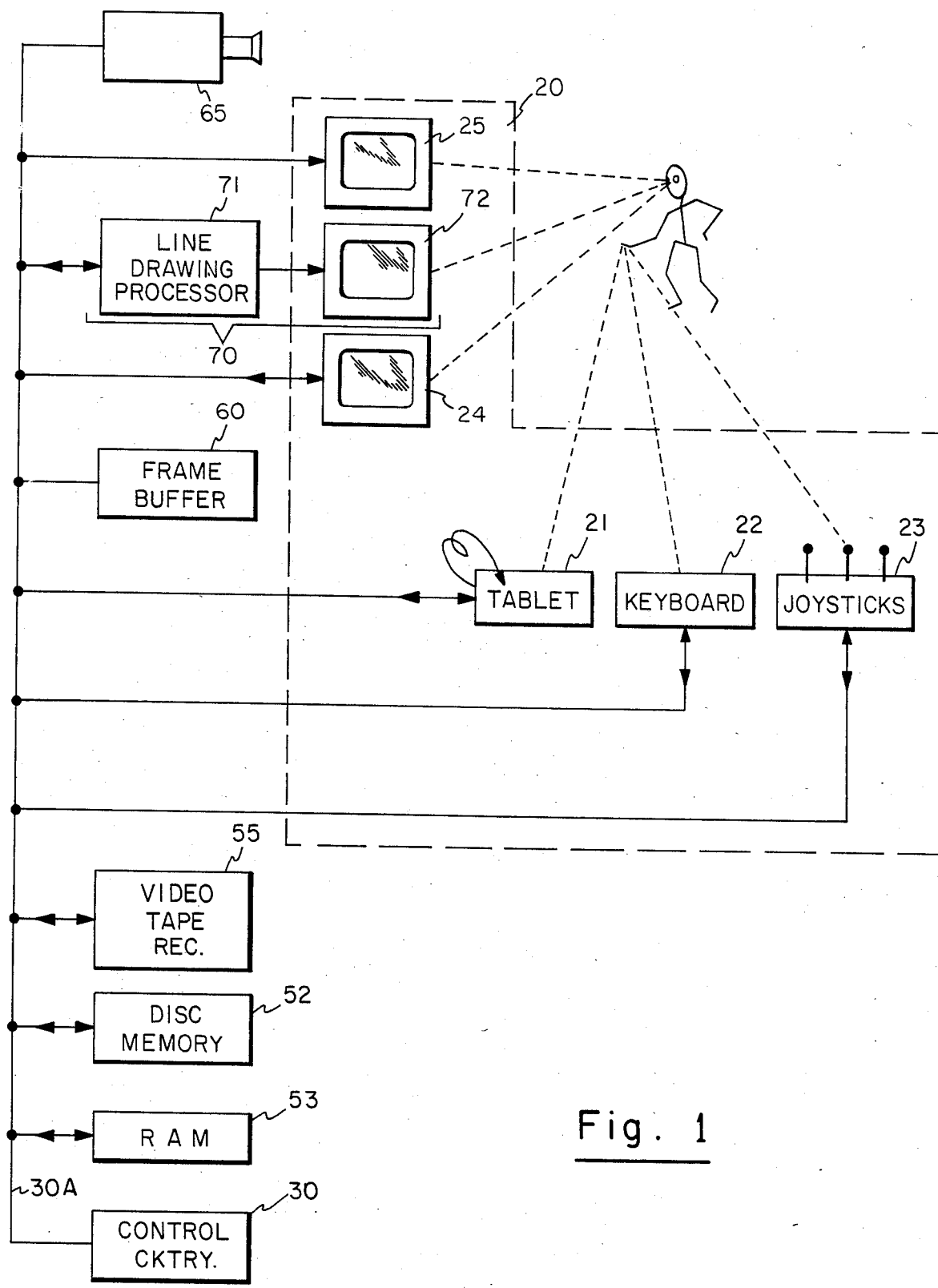
FIG. 1 is a block diagram of an apparatus in accordance with an embodiment of the invention, and which can be used to practice the method of the invention.

Referring to FIG. 1, there is shown a block diagram of an apparatus 10 in accordance with an embodiment of the invention and which can be used to practice the method of the invention. An operator 15, who is typically, but not necessarily, an animator of some artistic ability, works at a console which includes the devices illustrated within the dashed enclosure 20. In the present embodiment, the console includes three types of input devices whereby the animator can input information to the apparatus 10, viz. a data tablet 21, a keyboard 22, joysticks 23 and monitors on which information is displayed, viz. monochrome display 23 and optional color display 25.

The devices in the console 20 are coupled via a bus 30A to control circuitry 30. In the present embodiment the novel functions of control circuitry 30 are implemented by an appropriately programmed general purpose digital computer, for example the model VAX 11/780 or the model PDP-11/45 manufactured by Digital Equipment Corp. of Maynard, Mass. However, it will be understood that alternate means, such as a special purpose computer or other suitable circuitry having logic and storage capabilities could be utilized to achieve the desired functions. In conjunction with the general purpose digital computer 30 there is provided memory which includes fast access bulk storage such as disk memory 52, and random access storage labelled RAM 53. Typically, at least a portion of the random access memory will be included within the general purpose computer 30, and it will be understood that the amount and type of each storage medium or alternative storage can be selected by one skilled in the art.

An optional frame storage means 60 is provided and is coupled, inter alia, to the control circuitry 30 and to the color monitor 25. The frame storage means is of the type known as a "frame buffer" manufactured and sold by Genisco Computer Company of California. Essentially, the frame buffer 60 is an addressable digital memory which stores a frame of video information. The frame buffer 60 is coupled to the control circuitry 30 via the bus 30A so that the control circuitry 30A can typically be utilized to address any desired pixel in the frame buffer, for example to interrogate or read the pixel value contained therein or to write in a new pixel value at any point.

In the present embodiment of the invention, it is convenient although not required, to employ a commercially available processor for performing certain matrix transformations and display tasks which could alternatively be performed by general purpose processing and display circuitry. In particular, a three-dimensional line drawing display system with coordinate transformation and clipping hardware is collectively referred to as the line drawing system 70, and includes processor 71 and line drawing display 72. A suitable vector processing and display system is the Evans and Sutherland Company "Multi Picture System". A raster-based system which performs similar functions is described in an article entitled "Coprocessing to Ease The Graphics Burden" which appeared in the July, 1982 issue of "Computer Design". The system 70 is coupled via the bus 30A to the other equipment. A video tape recorder 55 and a television camera 65, may also be provided in the system.

Figure 2:
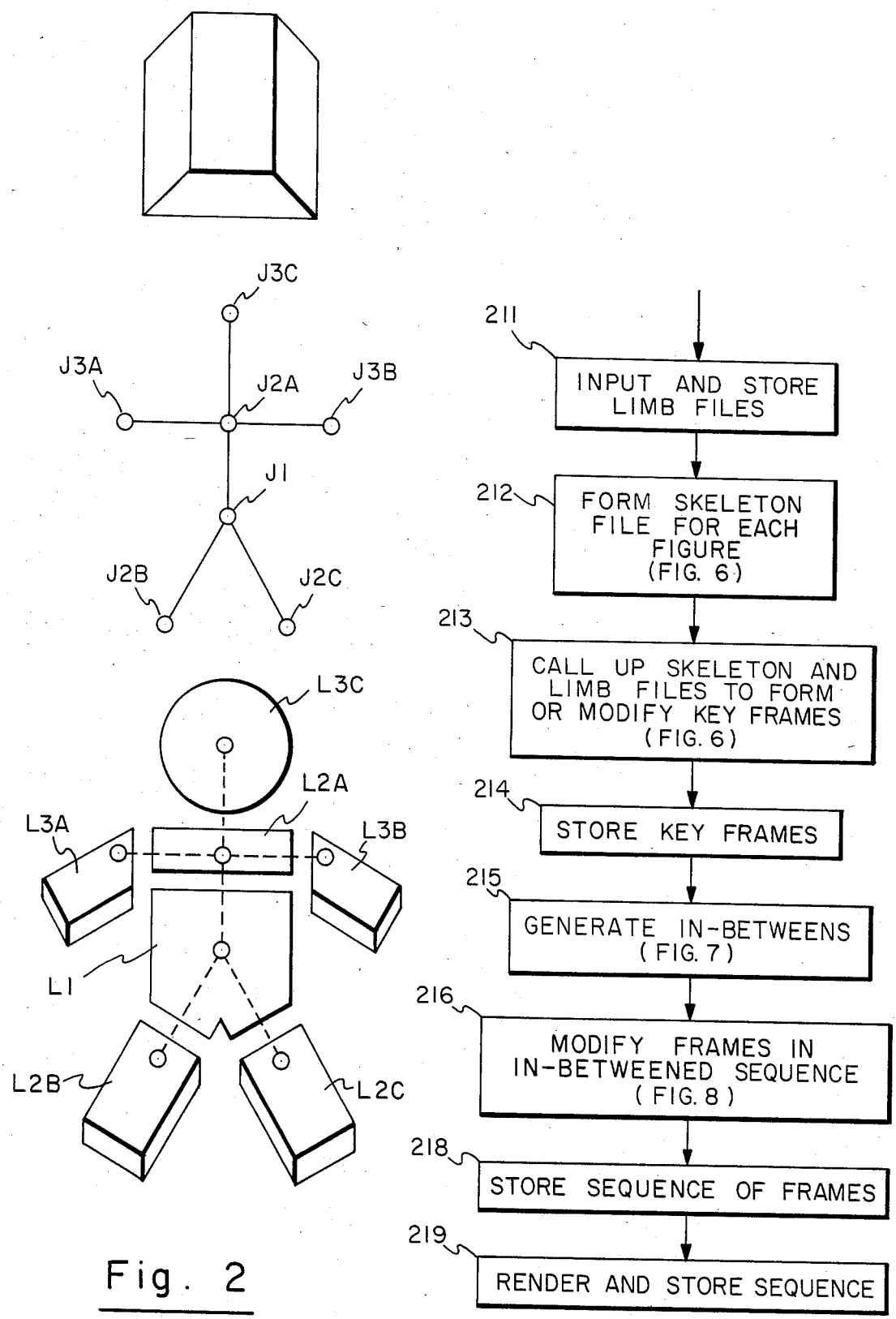
FIG. 2 is a flow diagram which describes the generalized procedure for producing three-dimensional animation on a two-dimensional screen, including the technique of the invention.

Referring to FIG. 2, there is shown a generalized flow diagram of a typical operational procedure for generating a sequence of frames of three dimensional animated scenes for display on a two-dimensional screen. It will be understood, however, that variations in this typical procedure can be employed, consistent with the principles of the invention, depending, inter alia, upon the type of animation to be produced, the source of component figures, and operator preference.

The block 211 represents the inputting and storage of limb files, which, if already existing, can be keyed in via the keyboard 22, or can be drawn in via the data tablet 21, or by using the joysticks and cursor control. In the present embodiment, each limb is represented, in known fashion, as a set of vectors in three dimensions which define the limb shapes to be used on the figures in the sequence of animation. The form of representing the vectors and limbs is treated hereinbelow. It should be noted that this part of the procedure is not strictly necessary to perform at this time (since limbs can be produced after the skeleton of joints is formulated, as described hereinbelow), but in many practical situations one can utilize previously stored three dimensional vector representations of limbs available from a "limb library". Also, it is usually convenient to generate limbs beforehand for use during the sequence of animation to be generated, it being understood that certain limbs can be utilized a number of times in the various figures of the animation. The representative limb to the left of block 211 is a simple robot foot.

The block 212 represents the formation of a skeleton file for each figure in the sequence of animation to be generated. As previously indicated, each figure includes one or more joints, and each joint has associated therewith a limb. Each joint is defined in each frame by operator-controllable parameters which determine the three-dimensional position, rotational orientation, and scale factors of a local coordinate system in which the limb vectors are placed. The joints of each figure are arranged in a hierarchical order, and the positional coordinates and rotational orientations of the local coordinate system for a particular joint are determined with respect to the local coordinate system of the next higher joint in the hierarchy. The information defining these parameters for each joint will be described in further detail hereinbelow. A simplified skeleton figure is illustrated to the left of block 212 of FIG. 2. In this sketch, the joints are represented by small circles and, for ease of illustration, straight lines are shown as connecting each joint to its "parent" joint; i.e., the joint of next highest priority in the joint hierarchy. In the sketch, the joint J1 is the highest priority joint for the figure, so the motion, rotation, or scaling of the joint parameters for J1 will serve to move, rotate, and scale the entire figure in the world coordinate system. The joints J2, connected to joint J1 as their parent, are the next lower order joints in the joint hierarchy. There are three such child joints J2, designated as J2A, J2B, and J2C. Also, the joint J2A is a parent of three more child joints designated as J3A, J3B, and J3C.

Figure 3:
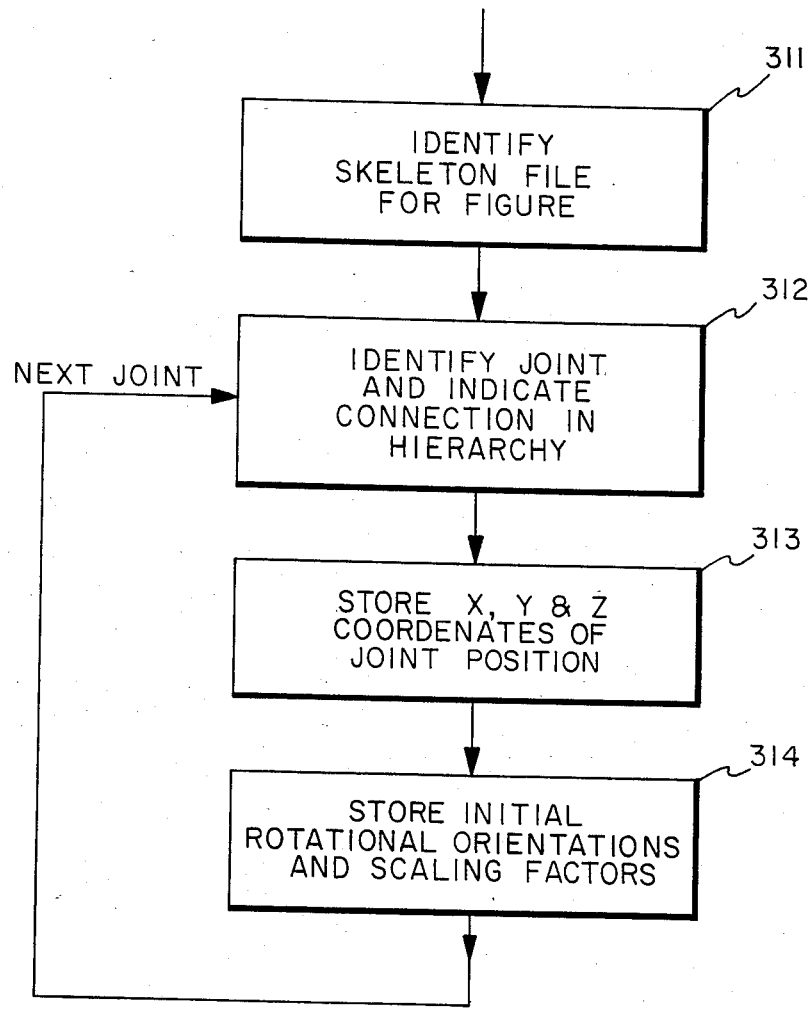
FIG. 3 is a flow diagram of the routine for forming skeleton files for a sequence of animation to be generated.

The routine for forming and storing the figure skeletons is shown in FIG. 3. The block 311 represents the identification of the skeleton file for the particular figure whose skeleton is to be generated. A joint is identified to be input (block 312) and its connection in the hierarchy is indicated, e.g., by identifying its parent joint. If desired, the skeleton can be displayed during this operation (see display routine of FIG. 7). Initial x, y and z coordinates of the joint position are stored, as represented by the block 313. Initial rotational orientation values and scaling factor values can then also be stored (for example, zero degrees rotation and unity scaling factor, as initial values) as represented by the block 314. The meaning and purpose of these values are described further hereinbelow. The next joint of the figure can then be added (re-entry to block 312). Additional figure skeletons can be formed and stored by repeating the procedure.

Referring again to FIG. 2, the block 213 represents the portion of the generalized procedure wherein individual figures of a frame are formed, so that the desired poses are obtained for the key frames of the animation sequence to be generated. This routine is described in conjunction with FIG. 6. The figure sketched to the left of block 213 is useful for initial illustration of how the limbs, designated with notation similar to the joints with which they are respectively associated, except that an L is used instead of a J, are stored in conjunction with the skeleton file. Thus, each joint of the skeleton file for a figure has stored in conjunction therewith a limb file (or identification of the limb file) for the particular limb that is selected by the operator for use at a particular joint position of the figure.

Figure 7:
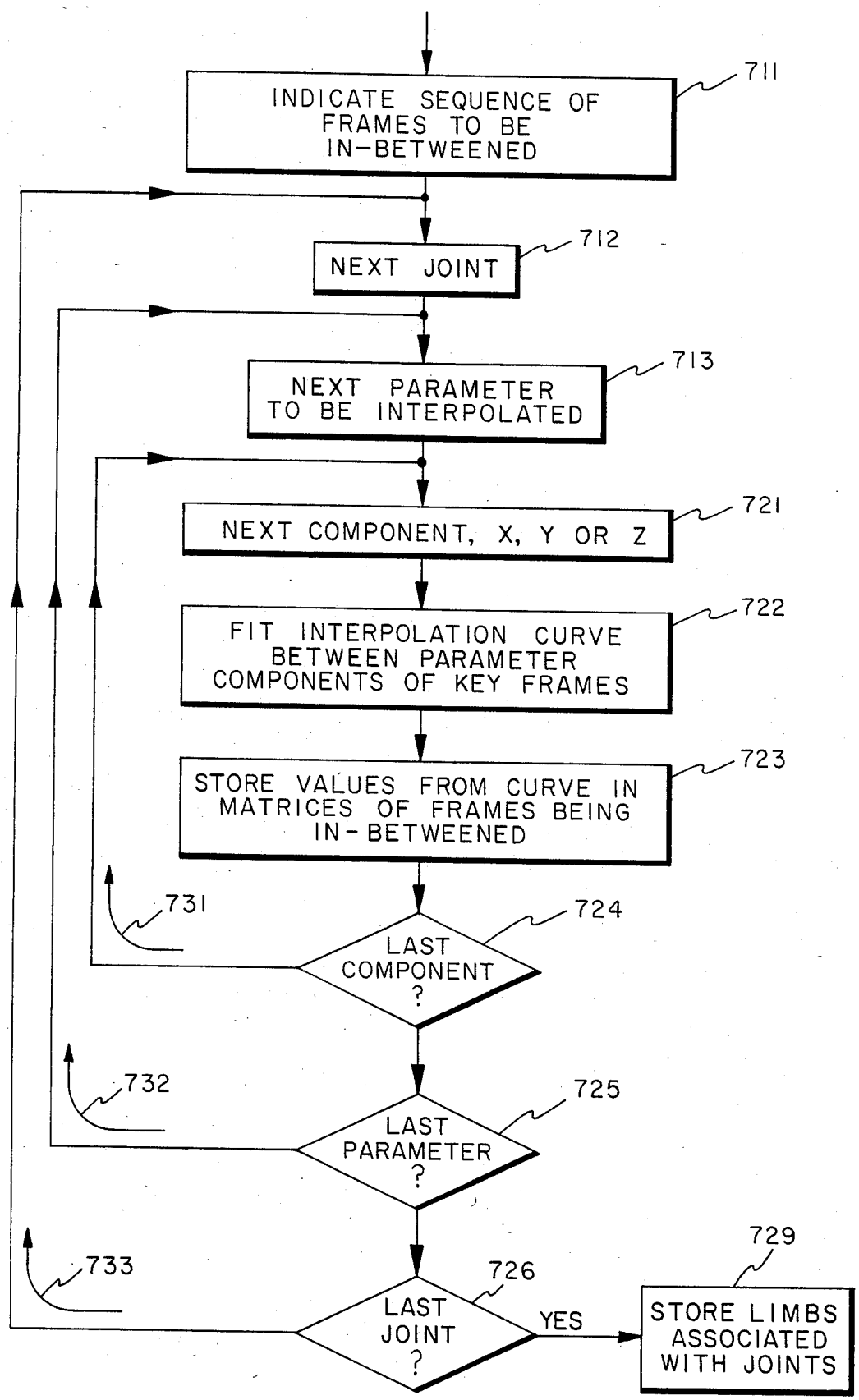
FIG. 7 is a flow diagram of the routine for generating in-between frames.

The key frames are stored (block 214) and, under operator control, in-between frames can be automatically generated (block 215) in accordance with the principles of the invention, and as described in conjunction with the routine of FIG. 7. During or after such generation of in-betweens, the sequence of animated frames can be displayed, and modifications to the sequence can be implemented, as represented by block 216 and as described in conjunction with the routine of FIG. 8. The final sequence of frames can then be stored (block 218) and rendered (block 219) by providing appropriate surface characteristics to the wire frame type structures that result from the described procedure. Appropriate color rendering can also be implemented, as is known in the art. One or more frame buffers (e.g. 60) and color monitor 25 can be used toward this end. In this regard, reference can again be made to the book "Principles of Interactive Computer Graphics", as well as to U.S. Pat. Nos. 4,189,743 and 4,189,744, assigned to the same assignee as the present application, and to the patents listed in the background portion hereof.

The position, orientation, and scaling factors of the set of local coordinates for a particular joint is defined with respect to the coordinate axes of the next higher priority joint in the hierarchy of joints. In particular, a parametric matrix defining the local coordinate space is given by:

$$\begin{bmatrix} m_x & m_y & m_z \\ r_x & r_y & r_z \\ s_x & s_y & s_z \end{bmatrix} \quad (1)$$

The values $m_x$, $m_y$ and $m_z$ respectively represent the x, y, and z position or "move" coordinates of the origin of the local coordinate system (i.e., the point at which the particular joint is defined as being located) with respect to either the world coordinate system (for the highest priority joint) or to the local coordinate system of the next higher priority joint in the hierarchy of joints. The values $r_x$, $r_y$, and $r_z$ represent respective rotational angles around the x, y, and z coordinate axes of the local coordinate system (again, with respect to the orientations of the coordinate axes of the next higher priority joint coordinate system). The values $s_x$, $s_y$, and $s_z$ are scaling factors for the x, y and z directions of the local coordinate system. A value of unity is used to represent the normal scale factor in each dimension, and higher or lower numbers can be used to stretch or compress the limb associated with the local coordinate system in any direction.

Figure 4A:
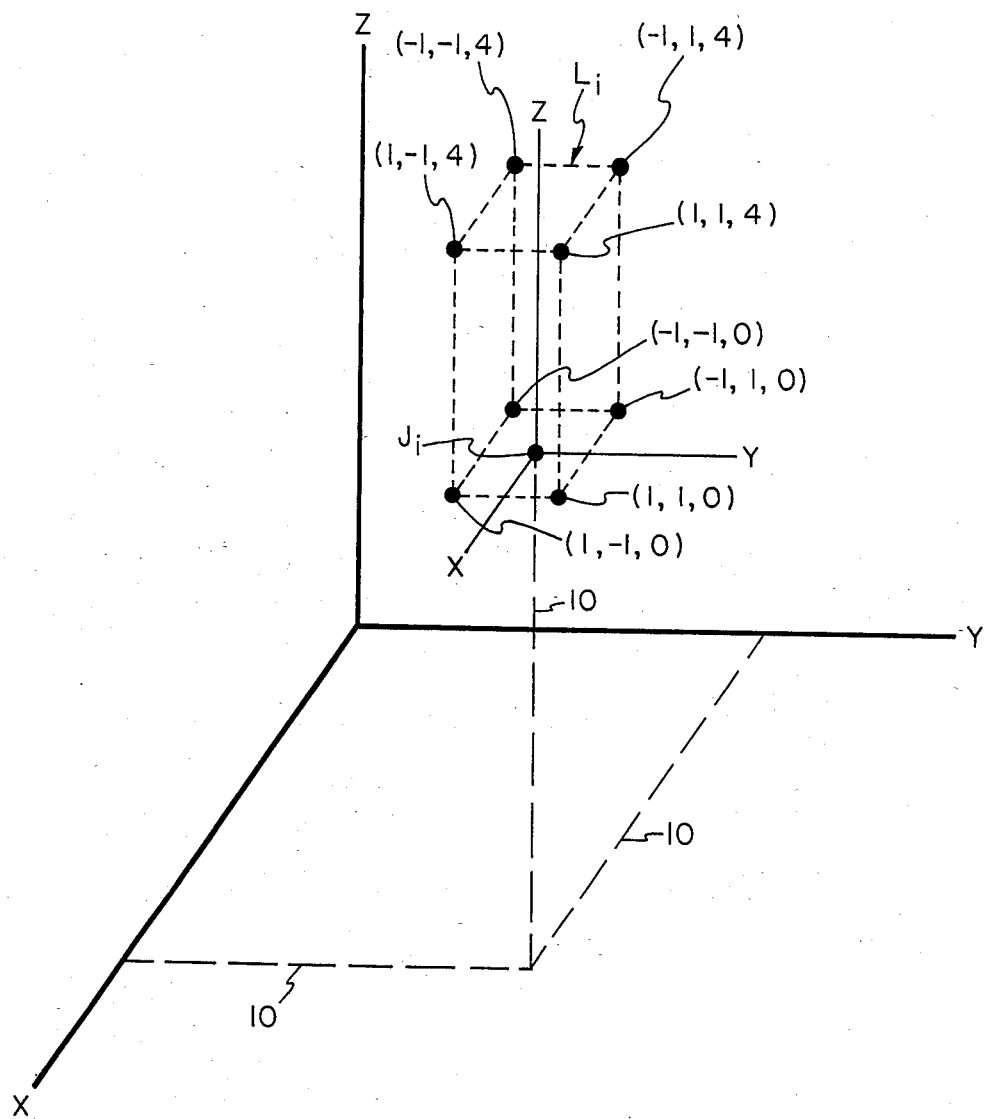
FIGS. 4A and 4B, illustrates a joint and limb in a local coordinate system, and shows the manner in which a joint and limb are represented and can be manipulated.
Figure 4B:
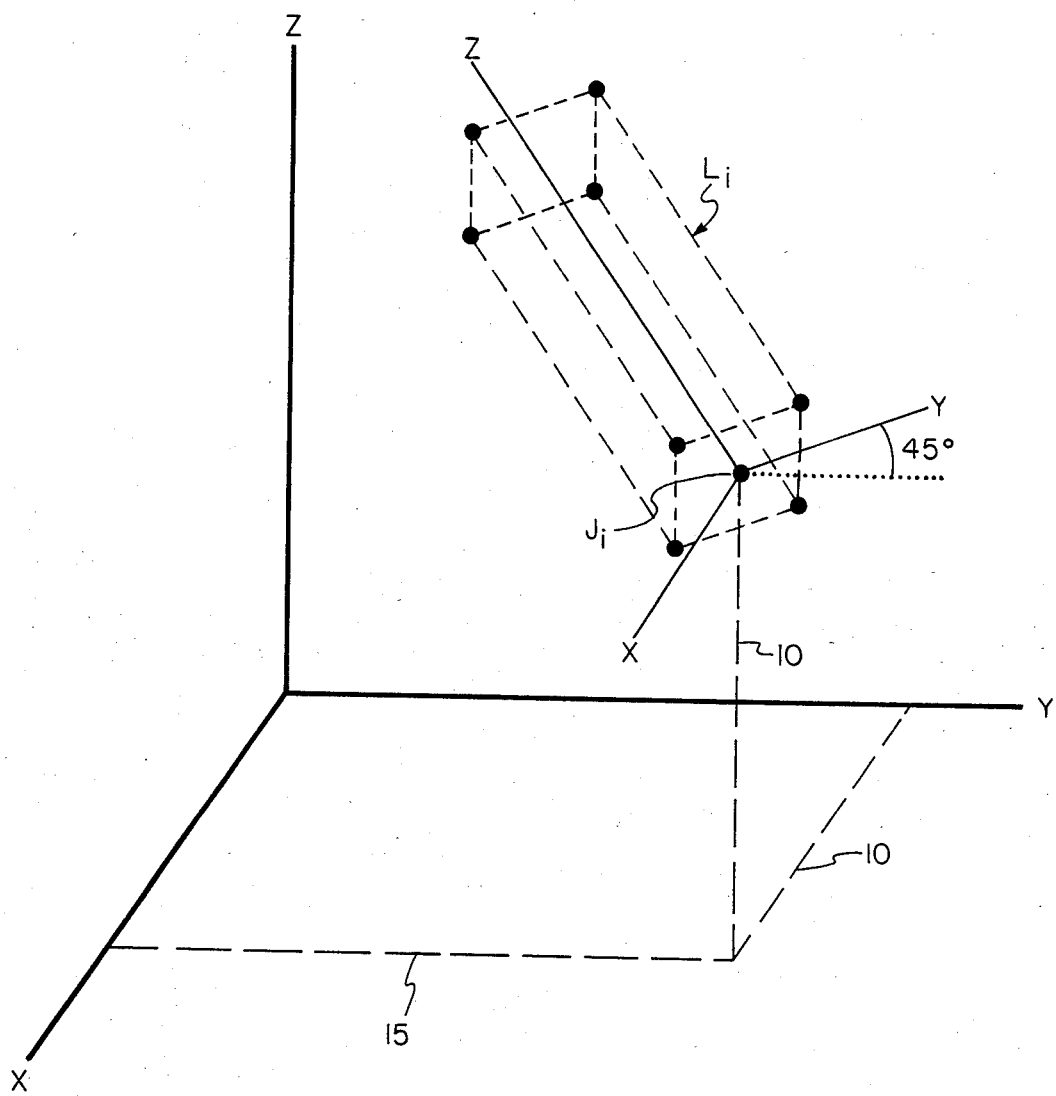

FIGS. 4A and 4B are useful in understanding the manner in which the joints and limbs are represented and manipulated. In FIG. 4A, there is shown the coordinate axes for an exemplary joint, $J_i$, and a limb, $L_i$, (shown in dashed line) of vectors associated with the joint. The matrix values for the joint $J_i$ is as follows:

$$\begin{bmatrix} 10 & 10 & 10 \\ 0° & 0° & 0° \\ 1 & 1 & 1 \end{bmatrix}$$

As seen in FIG. 4A, the origin of the local coordinate system for $J_i$ is at the point (10, 10, 10) in the main or "world" coordinate system (which, in this example, is the coordinate system of next higher priority in the hierarchy). Also, the x, y, and z axes are aligned with the axes of the world coordinate system, so the relative rotation angles in the second row of the matrix are all 0°. Finally, it is assumed that, for this example, the scale factors for the frame are all unity. The limb $L_i$ associated with the exemplary joint is represented by the following vector list:

[(1,1,0), (−1,1,0), (−1,−1,0), (1,−1,0), (1,−1,4)------]

The list sets forth the vertices of the limb as defined in the local coordinate system (FIG. 4). A comma separates the points which are joined by lines, so some individual points may be listed more than once.

Reference can now be made to FIG. 4B which represents the same joint $J_i$ and limb $L_i$, but with the position, orientation, and size and shape of the limb being different by virtue of modifications in the matrix values of the examplary joint. In particular, the matrix for the joint of FIG. 4B is as follows:

$$\begin{bmatrix} 10 & 15 & 10 \\ 45° & 0° & 0° \\ 1 & 1 & 2 \end{bmatrix}$$

In this case, the origin of the local coordinate axes (i.e., the joint position) is seen to be at the coordinates (10, 15, 10), which correspond to the values in the first row of the matrix. Also, it is seen that the y, z axes are rotated by 45° around the x axis as compared to the orientations of the y, z axes in the parent "world" coordinate system. Accordingly, the second row of values has a 45° rotational angle indicated in the x column, and 0° rotational angles indicated for rotation around the y and z axes. Regarding scaling, the limb of FIG. 4A is seen to be doubled in length or "stretched" along the z axis (only). Thus a scale factor of 2 is indicated in the z column of the third row of the matrix. It will be understood that in the present embodiment the representations of the limb vectors can remain fixed during a sequence of animation, with the changes in position, orientation, and size and shape of the limb being achieved by modification of the parametric matrix of the joint with which the limb is associated. Also, when a modification in a parameter of a joint is implemented, it is seen that the limbs of all lower priority joints are effectively modified along with their parent joints.

It is known in the computer graphics art that geometric transformations can be used in generating an image on a two-dimensional screen of three-dimensional scenes. Reference can be made, for example, to the book, "Principles of Interactive Computer Graphics," referred to hereinabove. In the present invention, matrix transformations are employed to transform the limb vectors in a given local coordinate system into equivalent vectors in the joint coordinate system of next highest priority. The procedure is repeated for successively higher priority joint coordinate systems until the limb vectors are expressed in terms of the world coordinate system. Finally, a perspective transformation is used to project the three-dimensional scene onto a two-dimensional surface (e.g. corresponding to the display screen surface). This perspective transformation depends upon the location, rotational angle and viewing angle of an imaginary camera whose position and other parameters are variable under operator control, such as by manipulating one of the joy sticks.

It is known that if a geometric transformation does not deform an object it transforms, then it must be decomposable into primitive translation and rotation transformations. As described, the inclusion of a scaling transformation allows stretching and contraction of limbs during motion. The matrix transformation which translates a point (x,y,z) to a new point (x',y',z') is known to be:

$$[x' \ y' \ z' \ 1] = [x \ y \ z \ 1] \begin{bmatrix} 1 & 0 & 0 & 0 \\ 0 & 1 & 0 & 0 \\ 0 & 0 & 1 & 0 \\ m_x & m_y & m_z & 1 \end{bmatrix}$$

where $m_x$, $m_y$ and $m_z$ are the components of the translation or move in the x, y and z directions respectively, and the 1 in each fourth column is the homogeneous coordinate.

Rotation about the z axis (for example), through an angle $\theta$ can be achieved with the following transformation:

$$[x' \ y' \ z' \ 1] = [x \ y \ z \ 1] \begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

It can be noted that this transformation matrix affects only the values of the x and y coordinates. Similarly derived transformation matrices can be set forth for rotation about the x and y coordinate axes.

A scaling transformation, for use to scale dimensions in each coordinate direction, is as follows:

$$[x' \ y' \ z' \ 1] = [x \ y \ z \ 1] \begin{bmatrix} s_x & 0 & 0 & 0 \\ 0 & s_y & 0 & 0 \\ 0 & 0 & s_z & 0 \\ 0 & 0 & 0 & 1 \end{bmatrix}$$

where $s_x$, $s_y$, and $s_z$ are, respectively, the scaling factors in the x, y and z directions.

If the translation, composite rotation, and scaling matrices are represented by [M], [R], and [S], respectively, a composite transformation matrix [T], can be set forth as:

[T]=[M][R][S]

This composite transformation matrix corresponds to the composite parameter matrix for the joint local coordinate system first set forth above at (1).

To transform the vectors of a limb associated with a joint $J_n$ which has respective parent, grandparent, etc. joints $J_{n-1}$, $J_{n-2}$, etc., into a main or world coordinates system (represented as $J_0$), the overall transformation matrix, $[T_{n \to 0}]$ can be represented as the concatenation of the various local matrix transformations, as follows:

$[T_{n \to 0}] = [T_1][T_2]\text{-----}[T_{n-1}][T_n]$ where the subscripts of the transforms and the joints correspond.

Once expressed in terms of the world coordinate system, a known viewing transformation [V] can be used to convert points in camera two-dimensional perspective coordinate system ($x_c$, $y_c$) in accordance with:

$[x_c y_c z_c w_c] = [x_w y_w z_w 1][V]$ where [V] is known to be a composite viewing transformation that is built up from several translations and rotations that are determined from the viewing parameters, and $w_c$ is the resulting homogeneous coordinate. Reference can again be made, for example, to the previously cited book and patents. The transformation to the appropriate two-dimensional coordinates (x,y) is thereby seen to be achieved by multiplying the points in the world coordinate system by the viewing transformation and subsequent division by the homogeneous coordinate.

Figure 5:
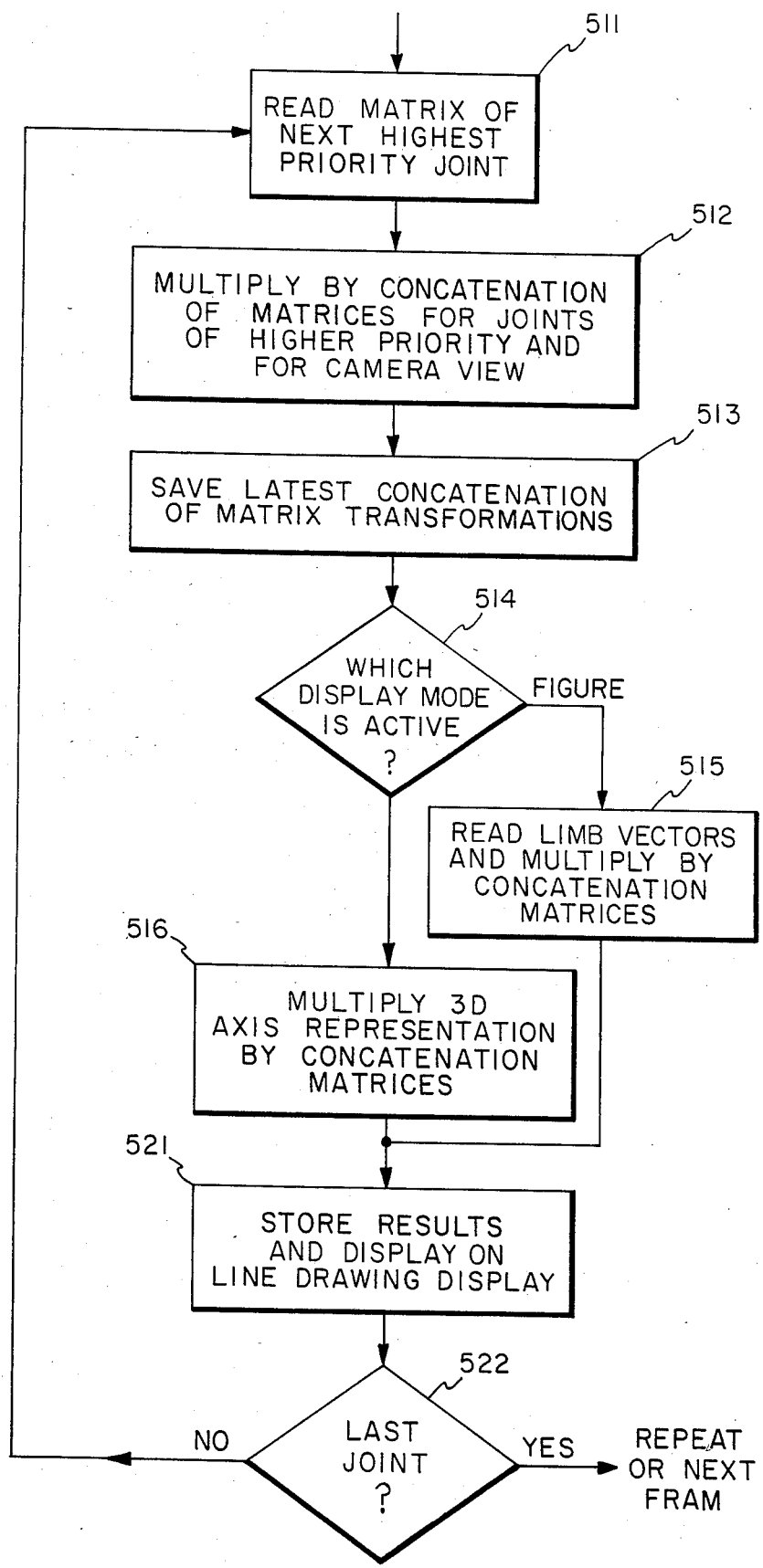
FIG. 5 is a flow diagram which illustrates the routine for displaying frames of figures represented by joints and limbs in three dimensions on a two-dimensional display.

Referring to FIG. 5, there is shown a flow diagram of a routine for controlling the display of the three-dimensional images stored in memory in joint and limb format. In general, the routine involves the obtainment of the two-dimensional (x,y) coordinates of the figures to be displayed (for each frame) by concatenation of matrix transforms, as previously described, to obtain the two-dimensional projections of the limb vectors in the main world coordinate system as viewed with an operator-selected imaginary camera. The two-dimensional projections are displayed on the line drawing display 72 of system 70. The set-up and multiplication of the matrices can be implemented in the general purpose processor 30 but, more preferably, is achieved by providing the matrix information to the system 70 which is well suited for this purpose.

In FIG. 5, the block 511 represents the reading of the stored parametric matrix of the next highest priority joint (beginning with the highest priority joint). In the present embodiment, the joints are processed in order, from highest priority to lowest priority, as this facilitates the computations. The block 512 is then entered, this block representing the multiplication of the matrix for the current joint by the concatenation of matrix transformations for the previous joints of higher priority than the joint currently being processed and then by the viewing transformation, consistent with relationships just set forth above. The latest concatenation of matrix transformation is stored, as represented by the block 513. It will be understood that when the next lower priority joint is processed, the stored concatenation of matrix transformations can be used again so as to reduce the necessary computation.

A determination is next made (decision diamond 514), as to which display mode is active. In the present embodiment, the operator can elect to display either limbs which comprise the actual figures, or skeletons which are useful in visualizing the positions of the joints and the statuses of the coordinate axes defined by the joints. If the figure limbs themselves are to be displayed, the block 515 is entered, this block representing the reading of the limb vector coordinates associated with the current joint, and the multiplication of each point by the concatenated matrix transformation. If the figure skeletons are to be displayed, a basic orthogonal coordinate system representation (i.e., three mutually orthogonal lines), can be multiplied by the concatenated matrix transformation, so as to obtain properly oriented and scaled local coordinate axes representation at each joint position, as shown in the small sketch near block 516. The block 521 is then entered (from block 515 or 516), this block representing the storage and display of results on line drawing display 72 of system 70. A determination is then made (diamond 522) as to whether or not the last joint in the frame has been processed. If not, the block 511 is reentered. When all joints have been processed, display of the frame can be repeated, or the next frame displayed, depending upon the function being performed.

Figure 6:
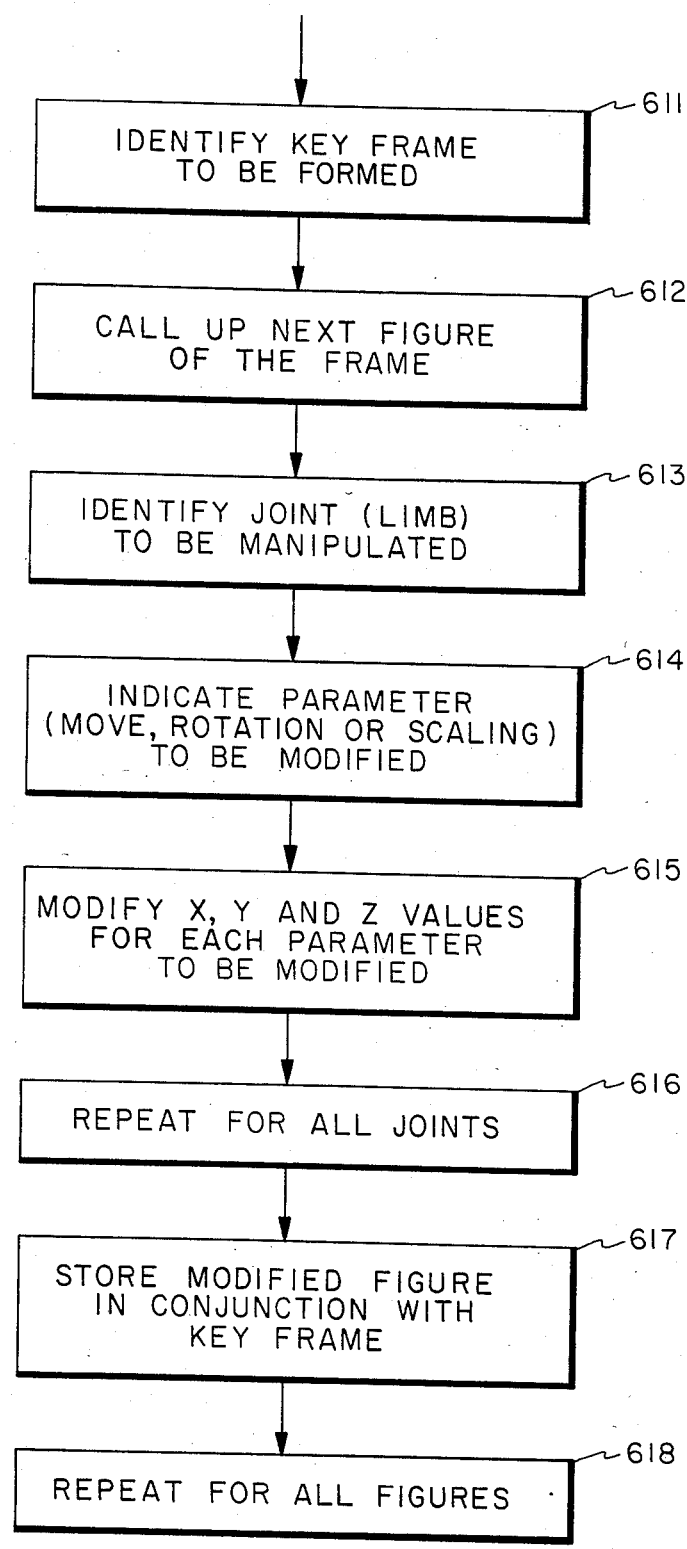
FIG. 6 is a flow diagram of the routine for forming a frame, such as the key frame.

Referring to FIG. 6, there is shown a flow diagram of routine for forming and modifying the key frames, as represented generally by the block 213 of FIG. 2. The key frame to be formed is identified (block 611), and the first figure to be placed in the scene represented by the key frame being formed is accessed by calling up its skeleton file (and the limb file which was previously stored in conjunction with the skeleton file), as represented by the block 612. The joint (and accompanying limb) to be manipulated is then identified, as represented by the block 613. As described hereinabove, the display of the figure can be implemented, at the operator's option, either in terms of a skeleton of joints or as a full figure of limbs. A cursor can be conventionally employed to identify the joint whose accompanying limb is to be manipulated. Alternatively, the limb associated with the joint to be manipulated can be identified with the cursor. The parameter to be modified, i.e. motion, rotation, or scaling, is identified, as represented by the block 614. In an embodiment of the present invention, a keyboard control key is utilized to identify the selected parameter, and a joystick is thereby placed in a mode to control the selected parameter. However, it will be understood that, if desired, separate joysticks can be provided for each parameter. In either event, motion of the joystick is effective to modify the x, y and z components of the selected row of the above-described parametric matrix (which, in turn, causes the displayed limb appearance to change accordingly, consistent with the described display routine). The modification of the values in the selected row of the joint's parametric matrix is represented by the block 615. The technique is repeated for all joints to be manipulated (block 616), and the modified figure is stored in conjunction with the key frame indication (block 617). The procedure can then be repeated, if desired, to add figures to the scene of the key frame and manipulate the figures as desired (block 618). In this manner, the individual key frames can be formulated and stored.

Figure 10:
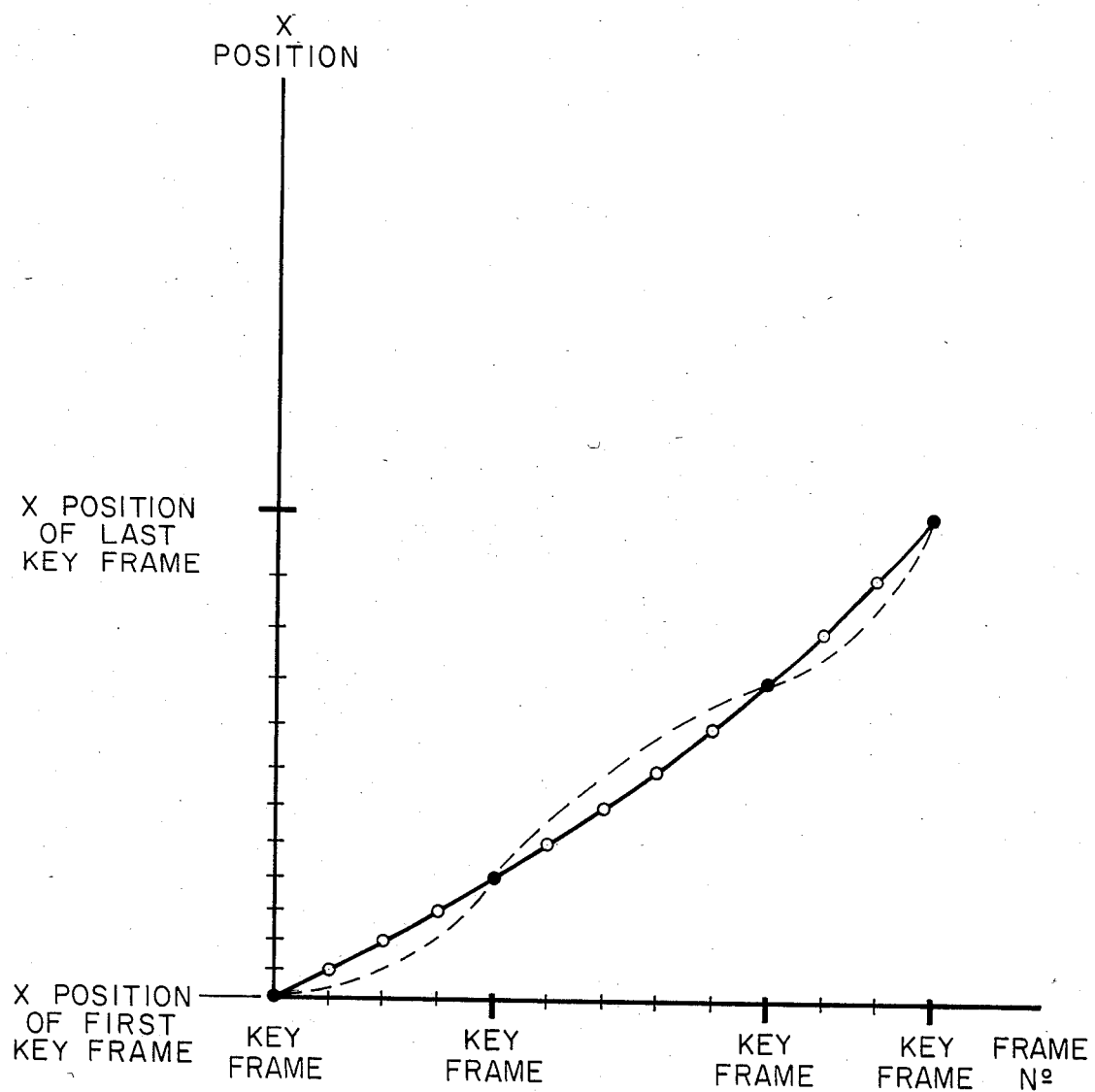
FIG. 10 is a flow diagram of the routine for modifying the interpolation curves.

FIG. 7 illustrates the routine of the present embodiment for generating in-between frames. It is assumed that for a sequence of frames to be in-betweened, there are a number of key frame poses for each of one or more figures, and the object of the in-between generation is to produce natural or other desired motion of figures in the sequence. The block 711 represents selection of the sequence of frames to be in-betweened. The joint to be treated is selected, (block 712), and the next parameter to be interpolated is selected, as represented by the block 713. Each of the motion, rotation, and scaling parameters of the transformation matrices of the current joint are interpolated in the present embodiment, and this is done for each of the x, y and z components. The x, y or z component is selected (block 721). Next, an interpolation curve is fit between the selected parameter values for the selected component. In an operational embodiment hereof, a cubic curve was fit through the points in a standard in-betweening plot of frame number versus the parameter being interpolated (see e.g. FIG. 10). Block 723 is then entered, this block representing the storage of values from the interpolation curve in the transformation matrices of the frames being in-betweened. In particular, the selected one of the nine values in the parametric matrix described above for each joint is stored for each of the in-between frames, based on the value of such parameter component taken from the cubic interpolation curve. Determination is then made as to whether or not all three components have been considered (diamond 724). If not, the loop 731 continues. When complete, a determination is made (diamond 725), as to whether or not all parameters have been processed. If not, the loop 732 continues. When all parameters have been processed, determination is made (diamond 726), as to whether or not all joints for all figures in the sequence of frames have been processed. If not, the loop 733 is continued until all joints have been processed, as described. In this manner, the in-between frames are formed and stored. It can be noted, as represented by the block 729, that the limbs associated with each joint are obtained in conjunction with the joint in each frame of the sequence, the motion of the limb being completely defined as described above, by the matrix transformation values of the associated joint.

Figure 8:
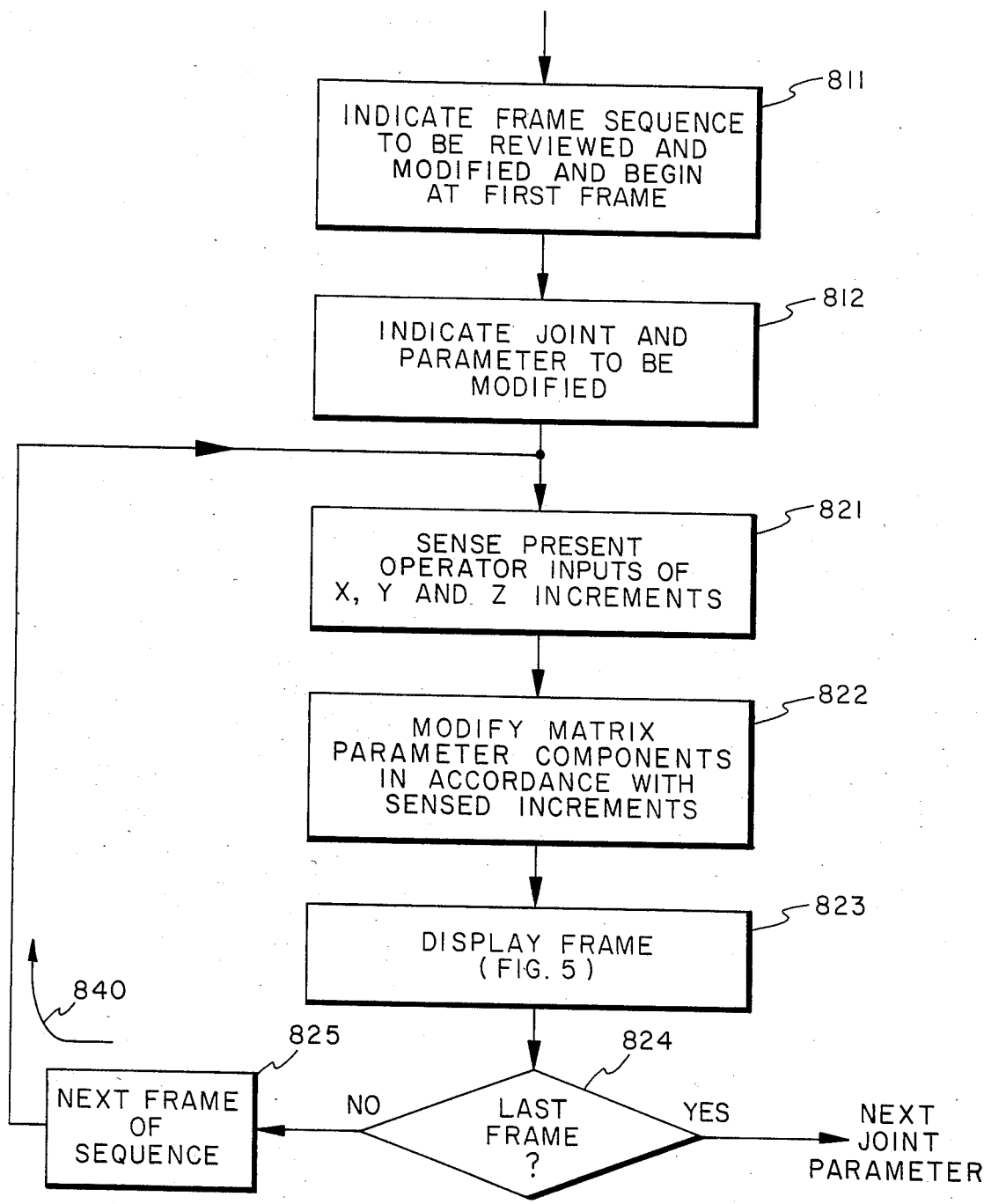
FIG. 8 is a flow diagram of a routine for modifying the motion of a limb during display.

In accordance with a feature of the invention, when a generated sequence of animation is displayed, the operator can modify the motion of a limb during a continuous display of the sequence. This is achieved by accessing the parametric transformation matrix for the joint associated with the selected limb, and substituting, during display of the sequence, parameter components which are selected by the operator (preferably, by manipulation of a joystick), and are used in place of the previously stored parameter components of the joint during the frame sequence in question. In the present embodiment, at each frame of a sequence being displayed, the x, y and z components of a selected parameter (move, rotation or scale factor) of a selected joint are incremented by an amount which is proportional to the operator selection of x, y and z values using the joystick. The routine for effecting this feature is illustrated in FIG. 8.

The frame sequence to be reviewed and modified is identified (block 811). The joint and parameter to be modified are selected by the operator, as represented by block 812. As frames are displayed, the operator manipulates the joystick to indicate increments in the x, y and z components of the selected parameter of the selected joint. The sensing of these increments is represented by the block 821. The matrix parameter components are modified in accordance with the sensed increments, as represented by the block 822. A frame is then displayed (block 823), in accordance with the display routine of FIG. 5. Determination is then made (diamond 824) as to whether or not the full sequence of frames has been displayed. If not, the next frame of the sequence is processed (block 825) by reentering block 821, and the loop is continued as each frame, with the modified limb, is displayed. The procedure can then be performed for any selected joint or parameter, under operator control. Also, it will be understood that both the old and new sequences of matrices for the selected joint can be saved so that the operator can decide what is to be used in the finally compiled frame sequence.

The motion of a limb during sequence of frames can also be varied by specific modification of the interpolation curve for each component of each parameter of transformation matrix of the joint associated with the particular limb. For example, in the present embodiment, the interpolation curve can be displayed, such as in FIG. 10 which shows a curve for the x component of position ("move") fitted to four key frames. The computed in-between frame x positions are shown as hollow dots and the key frame positions are shown as solid dots. The solid curve is the original interpolation curve, and the dashed line curve represents an operator-modified curve which can be input, for example, via the data tablet. Preferably, the old and new curves are both saved so that the motion of a particular limb can be modified until the operator is satisfied. It will be understood that similar operation can be performed for the x, y and z components of rotational orientation and scale factor, as well as for the other components of position.

Figure 9:
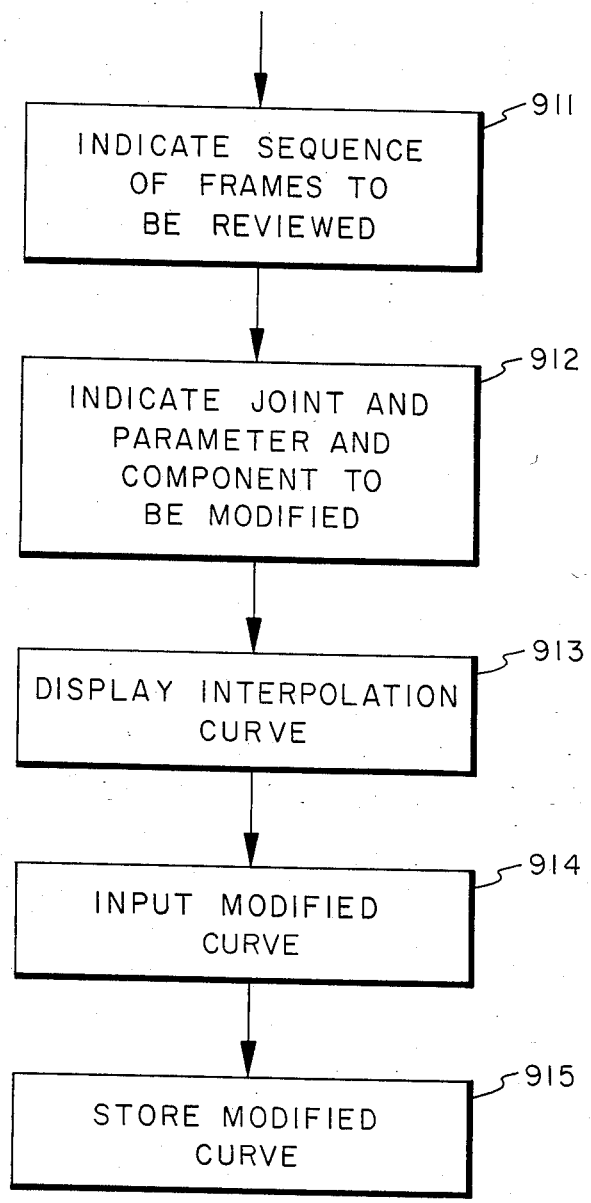
FIG. 9 shows an interpolation curve and a modified interpolation curve.

FIG. 9 illustrates the routine for accessing and modifying the interpolation curve as described. The operator first indicates the sequence of frames to be reviewed (block 911). The joint and parameter component to be modified are then identified (block 912) and the corresponding interpolation curve (see FIG. 7 routine) is displayed, as represented by the block 913. The operator can then draw the modified interpolation curve (or input the information in any other desired way), as represented by the block 914. The modified curve values can then be stored, and the sequence of frames reviewed with the new curve.

The invention has been described with reference to a particular embodiment, but variations within the spirit and scope of the invention will occur to those skilled in the art. For example, it will be understood that key frames can be defined in terms of individual figures which have key poses in those frames, so that different frames will be considered key frames with regard to different figures. Also, the invention is not dependent upon any particular type of coordinate transformations or viewing transformations being used, and additional techniques, such as for handling clipping can be implemented, as is known in the art. While the invention is described in terms of a monochrome system, it has application to color systems as well. It will also be understood that special purpose hardware implementations of various described portions of the system could be used if desired. Finally, it can be noted that means, such as television camera 65, can be used to obtain images of figures and basic positions and geometries of three-dimensional figures can be developed using these images as an aid.

I claim:

1. A method for generating a sequence of video frames representative of three-dimensional animation, comprising the steps of:
    storing a plurality of key frames, each including a common figure having one or more joints, each joint having associated therewith a set of vectors defining a limb, each joint being defined in each key frame by operator-controllable parameters which determine in three dimensions the position, rotational orientation, and scale factors of a local coordinate system in which the limb vectors are placed;
    generating a plurality of in-between frames which include said common figure having one or more joints and associated limbs corresponding to the joints and associated limbs of said common figure in successive key frames, the parameters of the joints of an in-between frame being obtained as follows:
    (a) performing an interpolation, in each dimension, of the position, rotational orientation, and scale factor, for the local coordinate system associated with a joint, such that the interpolated parameter values of the joint lie between the parameter values associated with the corresponding joints of the successive key frames; and
    (b) repeating step (a) for other joints of said common figure.

2. The method as defined by claim 1, wherein the joints of each figure are arranged in a hierarchical order, and wherein the positional coordinates and rotational orientations of the local coordinate system for a particular joint are determined with respect to the local coordinate system of the next higher joint in the hierarchy.

3. The method as defined by claim 1, further comprising the step of operator-controlling the interpolation, during generation of the in-between frames, so as to change the motion of a figure limb.

4. The method as defined by claim 2, further comprising the step of operator-controlling the interpolation, during generation of the in-between frames, so as to change the motion of a figure limb.

5. The method as defined by claim 1, further comprising the steps of determining the two-dimensional coordinates of said figure as viewed from an imaginary camera perspective, and displaying the figure on a screen.

6. The method as defined by claim 2, further comprising the steps of determining the two-dimensional coordinates of said figure as viewed from an imaginary camera perspective, and displaying the figure on a screen.

7. The method as defined by claim 3, further comprising the steps of determining the two-dimensional coordinates of said figure as viewed from an imaginary camera perspective, and displaying the figure on a screen.

8. The method as defined by claim 4, further comprising the steps of determining the two-dimensional coordinates of said figure as viewed from an imaginary camera perspective, and displaying the figure on a screen.

9. The method as defined by claim 7, wherein said step of controlling the interpolation comprises operator-controlling, during display of the figure in said sequence of video frames, the three-dimensional components of position, rotational orientation, or scaling of the joint associated with said limb.

10. The method as defined by claim 8, wherein said step of controlling the interpolation comprises operator-controlling, during display of the figure in said sequence of video frames, the three-dimensional components of position, rotational orientation, or scaling of the joint associated with said limb.

11. The method as defined by claim 9, wherein said operator-controlling of three-dimensional components comprises manipulating a joystick during said display of the figure in said sequence of video frames.

12. The method as defined by claim 10, wherein said operator-controlling of three-dimensional components comprises manipulating a joystick during said display of the figure in said sequence of video frames.

13. The method as defined by claim 1, further comprising the step of displaying a curve representative of a component of the three-dimensional interpolation of the position, rotational orientation, or scale factors of a figure limb; operator-modifying said curve; and storing joint parameters corresponding to values of the modified curve; so as to modify motion of said figure limb during said sequence of video frames.

14. The method as defined by claim 2, further comprising the step of displaying a curve representative of a component of the three-dimensional interpolation of the position, rotational orientation, or scale factors of a figure limb; operator-modifying said curve; and storing joint parameters corresponding to values of the modified curve; so as to modify motion of said figure limb during said sequence of video frames.

15. Apparatus for generating a sequence of video frames representative of three-dimensional animation, comprising:

means for storing a plurality of key frames, each including a common figure having one or more joints, each joint having associated therewith a set of vectors defining a limb, each joint being defined in each key frame by operator-controllable parameters which determine in three dimensions the position, rotational orientation, and scale factors of a local coordinate system in which the limb vectors are placed; and means for generating a plurality of in-between frames which include said common figure having one or more joints and associated limbs corresponding to the joints and associated limbs of said common figure in successive key frames;

said means for generating in-between frames including means for obtaining the parameters of the joints of an in-between frame by performing an interpolation, in each dimension, of the position, rotational orientation, and scale factor, for the local coordinate system associated with each joint, such that the interpolated parameter values of the joint lie between the parameter values associated with the corresponding joints of the successive key frames.

16. Apparatus as defined by claim 15, wherein the joints of each figure are arranged in a hierarchical order, and wherein the positional coordinates and rotational orientations of the local coordinate system for a particular joint are determined with respect to the local coordinate system of the next higher joint in the hierarchy.

17. Apparatus as defined by claim 15, further comprising means for operator controlling the interpolation, during generation of the in-between frames, so as to change the motion of a figure limb.

18. Apparatus as defined by claim 16, further comprising means for operator controlling the interpolation, during generation of the in-between frames, so as to change the motion of a figure limb.

19. Apparatus as defined by claim 15, further comprising means for determining the two-dimensional coordinates of said figure as viewed from an imaginary camera perspective, and means for displaying the figure on a screen.

20. Apparatus as defined by claim 16, further comprising means for determining the two-dimensional coordinates of said figure as viewed from an imaginary camera perspective, and means for displaying the figure on a screen.

21. Apparatus as defined by claim 17, further comprising means for determining the two-dimensional coordinates of said figure as viewed from an imaginary camera perspective, and means for displaying the figure on a screen.

22. Apparatus as defined by claim 18, further comprising means for determining the two-dimensional coordinates of said figure as viewed from an imaginary camera perspective, and means for displaying the figure on a screen.

* * * * *

REEXAMINATION CERTIFICATE (1785th)
United States Patent [19]
Stern

[11] B1 4,600,919

[45] Certificate Issued Sep. 15, 1992

[54] THREE DIMENSIONAL ANIMATION

[75] Inventor: Garland Stern, Brookville, N.Y.

[73] Assignee: New York Institute of Technology, Old Westbury, N.Y.

Reexamination Request:
No. 90/002,379, Jun. 26, 1991

Reexamination Certificate for:
Patent No.: 4,600,919
Issued: Jul. 15, 1986
Appl. No.: 404,965
Filed: Aug. 3, 1982

[51] Int. Cl.⁵ .............................................. G09G 1/16
[52] U.S. Cl. .................................. 340/725; 340/728; 340/747
[58] Field of Search ............... 340/700, 723, 725, 728, 340/747, 744, 709, 724; 358/183

[56] References Cited
U.S. PATENT DOCUMENTS

| | | | |
|---|---|---|---|
| 3,190,955 | 6/1965 | Maurer | 358/96 |
| 3,364,382 | 1/1968 | Harrison, III | 340/725 |
| 3,523,289 | 8/1970 | Harrison, III | 340/725 |
| 3,585,628 | 6/1971 | Harrison, III | 340/725 |
| 3,603,964 | 9/1971 | Harrison, III | 340/725 |
| 3,700,792 | 10/1972 | Harrison et al. | 358/93 |
| 3,723,803 | 3/1973 | Harrison et al. | 340/725 |
| 3,729,129 | 4/1973 | Fletcher et al. | 340/709 |
| 3,747,087 | 7/1973 | Harrison et al. | 340/703 |
| 3,792,243 | 2/1974 | Appel et al. | 340/725 |
| 3,800,071 | 3/1974 | Reeber | 358/80 |
| 3,883,861 | 5/1975 | Heartz | 340/705 |
| 3,885,096 | 5/1975 | Inuiya | 178/15 |
| 3,899,662 | 8/1975 | Kreeger et al. | 364/522 |
| 3,906,197 | 9/1975 | Grover | 364/521 |
| 3,917,955 | 11/1975 | Inuiya | 250/549 |
| 3,996,673 | 12/1976 | Vorst et al. | 340/728 |
| 4,017,680 | 4/1977 | Anderson et al. | 358/242 |
| 4,045,789 | 8/1977 | Bristow | 340/725 |
| 4,053,740 | 10/1977 | Rosenthal | 364/410 |
| 4,116,444 | 9/1978 | Mayer et al. | 340/709 |
| 4,127,849 | 11/1978 | Okor | 340/703 |
| 4,177,462 | 12/1979 | Chung | 340/703 |
| 4,189,743 | 2/1980 | Schure et al. | 340/747 |
| 4,189,744 | 2/1980 | Stern | 358/93 |
| 4,200,867 | 4/1980 | Hill | 340/703 |
| 4,213,189 | 7/1980 | Mueller et al. | 364/900 |
| 4,232,374 | 11/1980 | Chung et al. | 364/900 |
| 4,233,631 | 11/1980 | Mahler | 358/183 |
| 4,251,816 | 2/1981 | Eppley | 340/747 |
| 4,425,559 | 1/1984 | Sherman | 340/747 |
| 4,489,389 | 12/1984 | Beckwith et al. | 364/522 |

OTHER PUBLICATIONS

Badler, N. I. et al—Digital Representatives of Human Movement; ACM Computing Surveys (Mar. 1979).
Badler, N. I. et al.—Special Problems in Human Movement Simulation; ACM (1980).
Burtnyk, N. et al.—Computer Graphics and Film Animation; Can. Jorn. et Op. Reg. and Info. Processing (1971).
Burtnyk, N. et al.—Computer-Generated Key Frame Animation; Journal of SMPTE (Mar. 1971).
Burtnyk, N. et al.—Towards a Computer Animating Production Tool—EUROCOMP (May 1974).
Hackathorn, Ronald J.—Anima II, A 3-D Color Animation System; SIGGRAPH Proceedings, 1977.
Newman, W. M. et al.—Principles of Interactive Computer Graphics, Chapter 22, Three Dimensional Transformations And Perspective—(1979 ed.).
O'Donnell, T. J. et al.—GRAMPS—A Graphics Language Interpreter for Real-Time, Interactive, Three-Dimensional Picture Editing and Animation, Computer Graphics, (Aug. 1981).
Reeves, W. T. Inbetweening for Computer Animation Utilizing Moving Point Constraints—Computer Graphics, (Aug. 1981).
Sutherland, I. E.—Sketchpad a Man-Machine Graphical Communication System—AFIPS 1963.
Zwarg, S. M.—Sailing—An Example of Computer Animation and Iconic Communication; AFIPS, May 1972.
"Computer-Assisted Visual Communication", Barry David Wessler, Ph.D. dissertation, Computer Science, University of Utah (1973).

*Primary Examiner*—Alvin Oberley

[57] ABSTRACT

The disclosure is directed to an improved method and apparatus for generating a sequence of video frames representative of three-dimensional animation. A plurality of key frames are stored, each key frame including a common figure having one or more joints, and each joint having associated therewith a set of vectors defining a limb. Each joint is defined in each frame by operator-controllable parameters which determine the three-dimensional position, rotational orientation, and scale factors of a local coordinate system in which the limb vectors are placed. A plurality of in-between frames are generated, the in-between frames including the common figure having one or more joints and limbs corresponding to the joints and limbs of the common figure in the key frames. The parameters of the joints of the in-between frames are obtained by interpolating in three dimensions, the position, rotational orientation, and scale factors of the corresponding joints of the key frames. In the preferred embodiment, the joints of each figure are arranged in hierarchical order, and the positional coordinates and rotational orientations of the local coordinate system for a particular joint are determined with respect to the local coordinate system of the next higher joint in the hierarchy. Also, the operator can control the interpolation during display of the in-between frames, so as to change the motion of a figure limb.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–22 are cancelled.

New claims 23–36 are added and determined to be patentable.

*23. The method as defined by claim 1, wherein said sets of vectors define three-dimensional limbs, and further comprising the steps of applying said sets of vectors defining said limbs to the joints of said generated in-between frames, and displaying the generated in-between frames as a continuous video sequence to view the motion of the three-dimensional limbs.*

*24. The method as defined by claim 23, wherein said displaying step includes determining the two-dimensional coordinates of said limbs as viewed from an imaginary camera perspective and displaying the figure as a continuous sequence of wire frame line drawings on a two-dimesional display.*

*25. The method as defined in claim 24, further comprising modifying in-between frames of said sequence of frames, and subsequently rendering the modified sequence of frames.*

*26. The method as defined by claim 23, further comprising modifying in-between frames of said sequence of frames, and subsequently rendering the modified sequence of frames.*

*27. The method as defined in claim 26, wherein said modifying includes operator-controlling the interpolation during said display of said generated sequence of frames so as to change the motion of a figure limb.*

*28. The method as defined in claim 23, further comprising operator-controlling the interpolation during said display of said generated sequence of frames, so as to change the motion of a figure limb.*

*29. The method as defined by claim 28, wherein the joints of each figure are arranged in a hierarchial order, and wherein the positional coordinates and rotational orientations of the local coordinate system for a particular joint are determined with respect to the local coordinate system of the next higher joint in the hierarchy.*

*30. The method as defined in claim 28, wherein said operator-controlling the interpolation comprises manipulating a joystick during said display of said generated sequence of frames.*

*31. The method as defined in claim 23, wherein the joints of each figure are arranged in a hierarchial order, and wherein the positional coordinates and rotational orientations of the local coordinate system for a particular joint are determined with respect to the local coordinate system of the next higher joint in the hierarchy.*

*32. Apparatus as defined in claim 15, wherein said sets of vectors define three-dimensional limbs, and further comprising means for applying said sets of vectors defining said limbs to the joints of said generated in-between frames, and means for displaying the generated in-between frame as a continuous video sequence to view the motion of the three-dimensional limbs.*

*33. Apparatus as defined in claim 32, further comprising means for modifying in-between frames of said sequence of frames, and means for subsequently rendering the modified sequence of frames.*

*34. Apparatus as defined by claim 32, wherein the joints of each figure are arranged in a hierarchical order, and wherein the positional coordinates and rotational orientations of the local coordinate system for a particular joint are determined with respect to the local coordinate system of the next higher joint in the hierarchy.*

*35. Apparatus as defined by claim 34, further comprising means for operator-controlling the interpolation during said display of said generated sequence of frames, so as to change the motion of a figure limb.*

*36. Apparatus as defined in claim 32, further comprising means for operator-controlling the interpolation during said display of said generated sequence of frames, so as to change the motion of a figure limb.*

* * * * *